Patented Jan. 7, 1936

2,027,330

UNITED STATES PATENT OFFICE

2,027,330

WELDING ROD ALLOYS

Richard A. Wilkins, Rome, N. Y., assignor to Revere Copper and Brass Incorporated, Rome, N. Y., a corporation of Maryland No Drawing. Application March 8, 1935, Serial No. 10,047

6 Claims. (Cl. 75—1)

My invention relates to alloys useful for welding purposes as, for example, for fabrication into welding rods.

The invention will be best understood from the following description of several examples of alloys compounded according to the invention.

Although it has been recognized that certain brasses have properties which are desirable in weld metal for uniting and building up metal parts, the attempt to use brass for this purpose has heretofore been unsuccessful. The attempt commonly has resulted in objectionable fuming of the zinc content, with consequent harmful effects on the operator. Also it has uniformly resulted in the formation of a weld metal which is porous and deficient in strength and hardness, with the result that a poor bond is secured.

Applicant has found that the above mentioned objections can be eliminated, and the properties of the weld metal improved, by use of small amounts of silicon in conjunction with nickel and iron in 50:50 to 65:35 brass; that is to say, brass having 50 to 65% copper. For example, by substituting for part of the copper of 50:50 to 65:35 brass, a combination of small percentages of nickel, iron and silicon, an alloy is produced which can be worked both hot and cold into welding rods suitable for welding steel as well as copper alloy parts. These rods are characterized by a lower melting point, and increased fluidity of the molten metal, the latter securing improved penetration by the weld metal, and both acting materially to increase the speed of welding. At the same time fuming of the molten metal and porosity of the weld metal are effectively prevented, the weld metal being dense, readily machinable, hard, and of great tensile strength.

In general, satisfactory results will be secured with a combination of 0.05 to 0.3% silicon, 0.25 to 5% nickel, and 0.25 to 3% iron substituted for an equal amount of the copper or the brass.

The amount of iron may be varied to control the hardness of the weld metal, the more iron employed the greater the hardness, yet within the range of iron specified the metal may be readily machined. Under ordinary conditions 1 to 2% iron will give satisfactory results, the preferable range of iron being 1.25 to 1.75%, as within this range a weld metal particularly suitable for building up worn machine bearing surfaces is secured.

The amount of nickel may be varied to control the strength of the bond. Under ordinary conditions 1 to 3% nickel will give satisfactory results, as with this amount of nickel a bond may be produced as strong or stronger than steel sheets welded together by the metal. For usual purposes the preferable range of nickel is 1.75 to 2.25%.

The amount of silicon may be varied to control the melting point of the rod and degree of fluidity of the molten metal. Under ordinary conditions effective results will be secured with 0.1 to 0.2% silicon.

Approximately 60:40 brass will give satisfactory results over a wide range of conditions representing those commonly met with in practice. The preferred alloy of this group has approximately 56 to 58% copper, 0.1 to 0.2% silicon, 1.75 to 2.25% nickel, 1.25 to 1.75% iron, balance zinc.

Preferably, to insure against the deleterious effects of oxides or sulphur which may be present in the constituent metals a small amount of manganese may be added to the melt. Sulphur tends to combine with the nickel in the absence of manganese to form deleterious nickel-sulphid. Manganese, having a greater affinity for sulphur than has nickel, will prevent this action, the manganese-sulphid formed not being particularly objectionable. The manganese will also prevent oxidization of the silicon, which should be avoided due to the small amount of silicon present. Under ordinary conditions about 0.2% manganese added to the melt will insure satisfactory results. Commonly part of the manganese burns off, ordinarily when added in this amount leaving not more than about 0.05% in the final alloy. The presence of excessive amounts of manganese should be avoided as the manganese tends to form a film on the molten weld metal and if present in excess will result in the formation of a poor bond. Applicant has found that amounts of manganese over 1% in the finished welding rod ordinarily are extremely harmful.

Small percentages of other metals may be added for imparting special characteristics to the alloy or the weld metal when they do not destroy the hereinbefore mentioned desirable properties of the same. Certain metals as, for example, aluminum, which decrease the facility with which the weld may be formed, should be avoided.

It will be understood from the preceding description that wide deviations may be made from the embodiments of the invention herein described without departing from the spirit of the invention.

I claim:

1. Hot and cold workable alloys capable, when deposited by a welding process, of forming a dense, machinable, hard weld metal of high tensile strength, containing 0.05 to 0.3% silicon, 0.25 to 5% nickel, 0.25 to 3% iron, and 35 to 50% zinc, with the balance substantially copper, and characterized by materially reduced fuming as compared to brass of the same zinc content.

2. Hot and cold workable alloys capable, when deposited by a welding process, of forming a dense, machinable, hard weld metal of high tensile strength, containing 0.1 to 0.2% silicon, 1 to 3% nickel, 1 to 2% iron, and 35 to 45% zinc, with the balance substantially copper, and characterized by materially reduced fuming as compared to brass of the same zinc content.

3. Hot and cold workable, non-fuming alloys capable, when deposited by a welding process, of forming a dense, machinable, hard weld metal of high tensile strength, containing 56 to 58% copper, 0.1 to 0.2% silicon, 1.75 to 2.25% nickel, and 1.25 to 1.75% iron, with the balance substantially zinc, and characterized by materially reduced fuming as compared to brass of the same zinc content.

4. The alloys according to claim 1 containing appreciable amounts up to 1% manganese.

5. The alloys according to claim 2 containing appreciable amounts up to 0.2% manganese.

6. The alloys according to claim 3 containing appreciable amounts up to 0.2% manganese.

RICHARD A. WILKINS.

CERTIFICATE OF CORRECTION.

Patent No. 2,027,330. January 7, 1936.

RICHARD A. WILKINS.

It is hereby certified that error appears in the printed specification of the above numbered patent requiring correction as follows: Page 1, first column, line 22, after "brass" strike out the semi-colon and insert instead a comma; and line 42, for "or" read of; and that the said Letters Patent should be read with these corrections therein that the same may conform to the record of the case in the Patent Office.

Signed and sealed this 18th day of February, A. D. 1936.

Leslie Frazer (Seal) Acting Commissioner of Patents.